(12) United States Patent
Yu et al.

(10) Patent No.: US 11,726,461 B2
(45) Date of Patent: Aug. 15, 2023

(54) METHOD, APPARATUS, ELECTRONIC DEVICE, MEDIUM, AND PROGRAM PRODUCT FOR MONITORING STATUS OF PRODUCTION ORDER

(71) Applicant: Siemens Aktiengesellschaft, Munich (DE)

(72) Inventors: Ming Yu, Wuhan (CN); Liang Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/763,563

(22) PCT Filed: Sep. 26, 2019

(86) PCT No.: PCT/CN2019/108241
§ 371 (c)(1),
(2) Date: Mar. 24, 2022

(87) PCT Pub. No.: WO2021/056349
PCT Pub. Date: Apr. 1, 2021

(65) Prior Publication Data
US 2022/0350315 A1    Nov. 3, 2022

(51) Int. Cl.
*G05B 19/418*    (2006.01)

(52) U.S. Cl.
CPC ... *G05B 19/41865* (2013.01); *G05B 19/4183* (2013.01); *G05B 19/41885* (2013.01)

(58) Field of Classification Search
CPC .......... G05B 19/4185; G05B 19/41865; G05B 19/4183; G05B 19/41885; G06Q 10/0631; G06Q 10/06; Y02P 90/02
See application file for complete search history.

(56) References Cited

U.S. PATENT DOCUMENTS

2011/0218842 A1*  9/2011  Addala ............ G06Q 10/06393
                                                        706/59
2018/0205793 A1*  7/2018  Loeb .................... G06T 19/003
(Continued)

FOREIGN PATENT DOCUMENTS

CN    108009739          5/2018  ............. G06Q 10/06
CN    108009739 A    *  5/2018  ...... G06Q 10/063114
(Continued)

OTHER PUBLICATIONS

Search Report for International Application No. PCT/CN2019/108241, 10 pages, dated Jun. 24, 2020.

*Primary Examiner* — Ronald D Hartman, Jr.
(74) *Attorney, Agent, or Firm* — Slayden Grubert Beard PLLC

(57) ABSTRACT

Various embodiments include a method for monitoring the status of a production order in a factory. The method may include: generating a production IoT model based on a production scheduling system document, the production IoT model comprising a first set process attributes of product processing; generating a product IoT model based on a product design specification document, the product IoT model comprising the first set of process attributes of product processing; associating the production IoT model with the product IoT model; learning data of a production device acquired by a data acquisition automation control system in the factory to obtain a data model representing processing steps of a product; and matching the processing steps against the process attributes of the product IoT model and determining the status of the production order in the factory based on the matching result.

12 Claims, 8 Drawing Sheets

(56) References Cited

U.S. PATENT DOCUMENTS

2018/0299878 A1* 10/2018 Cella ................. G05B 23/0283
2019/0052549 A1*  2/2019 Duggal ............... H04L 41/5019
2020/0279200 A1*  9/2020 Makhija .................. G06K 9/62

FOREIGN PATENT DOCUMENTS

| CN | 108596422   |   | 9/2018 | ............. G06Q 10/06    |
| CN | 108596422 A | * | 9/2018 |                             |
| CN | 110264061   |   | 9/2019 | ............. G06Q 10/06    |
| CN | 110264061 A | * | 9/2019 | ....... G06Q 10/06312       |
| CN | 114341899 A | * | 4/2022 | ............. G06Q 10/06    |

* cited by examiner

METHOD, APPARATUS, ELECTRONIC DEVICE, MEDIUM, AND PROGRAM PRODUCT FOR MONITORING STATUS OF PRODUCTION ORDER

CROSS-REFERENCE TO RELATED APPLICATIONS

This application is a U.S. National Stage Application of International Application No. PCT/CN2019/108241 filed Sep. 26, 2019, which designates the United States of America, the contents of which are hereby incorporated by reference in their entirety.

TECHNICAL FIELD

The disclosure generally relates to the technical field of the Internet of things (IoT). Various embodiments of the teachings herein include methods, apparatuses, electronic devices, media, and program products for monitoring the status of a production order.

BACKGROUND

In a factory operating system, artificial intelligence (AI) or other intelligence technologies can help process more and more data so that the system can run more efficiently. However, in order to recognize a specific scenario, it is necessary to label and structure all data to train an algorithm model. This requires an enormous amount of work. In addition, a large number of factories have some legacy devices only with a limited number of data interfaces and cannot provide abundant information for product process monitoring and optimization.

Currently, data is all manually marked and mapped. For example, an unmanned vehicle requires hundreds of millions of marked pictures to train a software algorithm, thus determining that there are pedestrians on a road. If data is incorrectly marked, a vehicle crash may happen. The same situation will also happen in a factory. Engineers need to mark and structure all data and then send the data to an automation system. Sometimes, it takes engineers weeks to make investigations and observations and communicate with the operators and the managers in the factory.

SUMMARY

A brief summary of the disclosure is given below so as to provide a basic understanding of some aspects of the teachings herein. It is not intended to determine the key or important parts, nor intended to limit the scope of the disclosure. The purpose is only to give some concepts in a simplified way and use them as an introduction to the detailed description discussed later. As an example, some embodiments include a method for monitoring the status of a production order in a factory, comprising: generating at least one production IoT model on the basis of a production scheduling system document, the production IoT model comprising at least process attributes of product processing, generating at least one product IoT model on the basis of a product design specification document, the product IoT model also comprising at least process attributes of product processing, associating a production IoT model with a product IoT model having the same process attributes, learning data of a production device acquired by a data acquisition automation control system in the factory to obtain a data model representing processing steps of a product, and matching the processing steps against the process attributes of the product IoT model and determining the status of the production order in the factory on the basis of the matching result.

In some embodiments, generating at least one production IoT model on the basis of the production scheduling system document comprises generating a production IoT model for each order No. in the production scheduling system document.

In some embodiments, generating at least one product IoT model on the basis of a product design specification document comprises extracting product metadata from a software design tool to generate the product IoT model.

In some embodiments, matching the processing steps against the process attributes of the product IoT model and determining the status of the production order in the factory on the basis of the matching result comprises determining the product and the order No. the current device processes according to the production IoT model and the product IoT model if a data change of the processing steps in the data model matches the process attributes of the product IoT model.

In some embodiments, the data acquisition automation control system comprises at least one of a vibration sensor, a current sensor, a temperature sensor and a humidity sensor.

In some embodiments, learning data of a production device acquired by a data acquisition automation control system in the factory to obtain a data model representing processing steps of a product comprises using a data clustering engine to learn the data to obtain a data model representing processing steps of a product on the basis of at least one of the change time of data, the change period of data and the amplitude of data.

As another example, some embodiments include an apparatus (200) for monitoring the status of a production order in a factory, comprising: a production IoT model generation unit (202), configured to generate at least one production IoT model on the basis of a production scheduling system document, the production IoT model comprising at least process attributes of product processing, a product IoT model generation unit (204), configured to generate at least one product IoT model on the basis of a product design specification document, the product IoT model also comprising at least process attributes of product processing, an IoT model association unit (206), configured to associate a production IoT model with a product IoT model having the same process attributes, a data model acquisition unit (208), configured to learn data of a production device acquired by a data acquisition automation control system in the factory to obtain a data model representing processing steps of a product, and an order status determination unit (210), configured to match the processing steps against the process attributes of the product IoT model and determine the status of the production order in the factory on the basis of the matching result.

In some embodiments, the production IoT model generation unit (204) is further configured to generate a production IoT model for each order No. in the production scheduling system document.

In some embodiments, the product IoT model generation unit (206) is further configured to extract product metadata from a software design tool to generate the product IoT model.

In some embodiments, the order status determination unit (210) is further configured to determine the product and the order No. the current device processes according to the production IoT model and the product IoT model if a data change of the processing steps in the data model matches the process attributes of the product IoT model.

In some embodiments, the data acquisition automation control system comprises at least one of a vibration sensor, a current sensor, a temperature sensor and a humidity sensor.

In some embodiments, the data model acquisition unit (208) is further configured to use a data clustering engine to learn the data to obtain a data model representing processing steps of a product on the basis of at least one of the change time of data, the change period of data and the amplitude of data.

As another example, some embodiments include an electronic device (800), comprising: at least one processor (802), and a memory (804) coupled with the at least one processor (802), the memory being configured to store instructions, and when the instructions are executed by the at least one processor (802), the processor (802) executing a method as described herein.

As another example, some embodiments include a non-transient machine-readable storage medium, storing executable instructions, and when the instructions are executed, the machine executing a method as described herein.

As another example, some embodiments include a computer program, comprising computer-executable instructions, and when the computer-executable instructions are executed, at least one processor executing a method as described herein.

As another example, some embodiments include a computer program product, the computer program product being tangibly stored in a computer-readable medium and comprising computer-executable instructions, and at least one processor executing a method as described herein.

BRIEF DESCRIPTION OF THE DRAWINGS

By reference to the description of the embodiments of the teachings of the present disclosure in combination with the drawings, the above-mentioned and other objects, features, and advantages will be understood more easily. The components in the drawings are only used to show the principle of the present disclosure. The same or a similar technical feature or component in the drawings is denoted by the same reference numeral.

DETAILED DESCRIPTION

Figure 1:
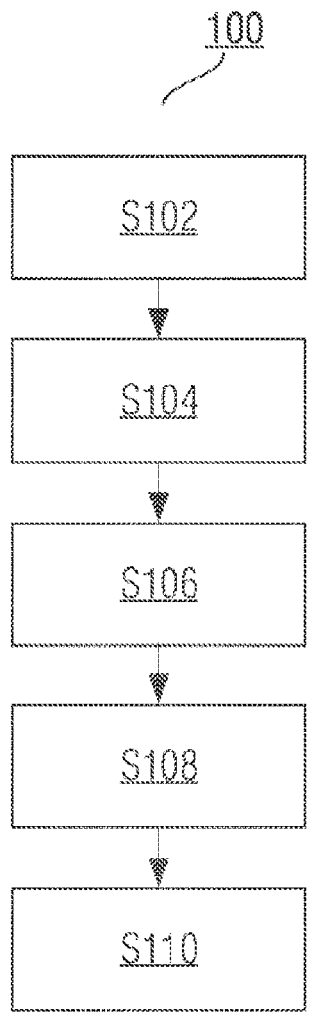
FIG. 1 is an exemplary flowchart of a method for monitoring the status of a production order in a factory incorporating teachings of the present disclosure.

In some embodiments, a method for monitoring the status of a production order in a factory comprises: generating at least one production IoT model on the basis of a production scheduling system document, the production IoT model comprising at least process attributes of product processing; generating at least one product IoT model on the basis of a product design specification document, the product IoT model also comprising at least process attributes of product processing; associating a production IoT model with a product IoT model having the same process attributes; learning data of a production device acquired by a data acquisition automation control system in the factory to obtain a data model representing processing steps of a product; and matching the processing steps against the process attributes of the product IoT model and determining the status of the production order in the factory on the basis of the matching result.

In some embodiments, generating at least one production IoT model on the basis of the production scheduling system document comprises generating a production IoT model for each order No. in the production scheduling system document.

In some embodiments, generating at least one product IoT model on the basis of a product design specification document comprises extracting product metadata from a software design tool to generate the product IoT model.

In some embodiments, matching the processing steps against the process attributes of the product IoT model and determining the status of the production order in the factory on the basis of the matching result comprises determining the product and the order No. the current device processes according to the production IoT model and the product IoT model if a data change of the processing steps in the data model matches the process attributes of the product IoT model.

In some embodiments, the data acquisition automation control system comprises at least one of a vibration sensor, a current sensor, a temperature sensor and a humidity sensor.

In some embodiments, learning data of a production device acquired by a data acquisition automation control system in the factory to obtain a data model representing processing steps of a product comprises using a data clustering engine to learn the data to obtain a data model representing processing steps of a product on the basis of at least one of the change time of data, the change period of data and the amplitude of data.

In some embodiments, an apparatus for monitoring the status of a production order in a factory is provided and the apparatus comprises: a production IoT model generation unit, configured to generate at least one production IoT model on the basis of a production scheduling system document, the production IoT model comprising at least process attributes of product processing; a product IoT model generation unit, configured to generate at least one product IoT model on the basis of a product design specification document, the product IoT model also comprising at least process attributes of product processing; an IoT model association unit, configured to associate a production IoT model with a product IoT model having the same process attributes; a data model acquisition unit, configured to learn data of a production device acquired by a data acquisition automation control system in the factory to obtain a data model representing processing steps of a product; and an order status determination unit, configured to match the processing steps against the process attributes of the product IoT model and determine the status of the production order in the factory on the basis of the matching result.

In some embodiments, the production IoT model generation unit is further configured to generate a production IoT model for each order No. in the production scheduling system document.

In some embodiments, the product IoT model generation unit is further configured to extract product metadata from a software design tool to generate the product IoT model.

In some embodiments, the order status determination unit is further configured to determine the product and the order No. the current device processes according to the production IoT model and the product IoT model if a data change of the processing steps in the data model matches the process attributes of the product IoT model.

In some embodiments, the data acquisition automation control system comprises at least one of a vibration sensor, a current sensor, a temperature sensor and a humidity sensor.

In some embodiments, the data model acquisition unit (208) is further configured to use a data clustering engine to learn the data to obtain a data model representing processing steps of a product on the basis of at least one of the change time of data, the change period of data and the amplitude of data.

In some embodiments, an electronic device comprises at least one processor and a memory coupled with the at least one processor, the memory is configured to store instructions, and when the instructions are executed by the at least one processor, the processor executes one or more of the above-mentioned methods.

In some embodiments, a non-transient machine-readable storage medium stores executable instructions, and when the instructions are executed, the machine executes one or more of the above-mentioned methods.

In some embodiments, a computer program comprises computer-executable instructions, and when the computer-executable instructions are executed, at least one processor executes one or more of the above-mentioned methods.

In some embodiments, a computer program product is tangibly stored in a computer-readable medium and comprises computer-executable instructions, and when the computer-executable instructions are executed, at least one processor executes one or more of the above-mentioned methods.

The methods and apparatuses described herein for monitoring the status of a production order can be used to match raw data in factory production against a production procedure to determine the production status in a factory, for example, the status of an order and the status of a device. Thus, the cost of marking data is reduced and the production is more efficient. In addition, the method and apparatus can help the manager to learn the production status in the factory and schedule the production.

Now, the subject described in this document is discussed by reference to exemplary implementation modes. It should be understood that the discussions about these implementation modes are only intended to let those skilled in the art have a better understanding so as to realize the subject described in this document, but are not intended to restrict the scope of protection, applicability, or examples described herein. Changes can be made to the functions and arrangements of the discussed elements without departing from the scope of protection of the disclosure. Various processes or components can be omitted, replaced, or added in different examples, as required. For example, the described method can be executed in a sequence different from what is described, and the steps can be added, omitted or combined. In addition, the features described in relation to some examples can also be combined in other examples.

As used in this document, the term "comprise" and its variants are open terms and mean "include but are not limited to." The term "on the basis of" means "at least partially on the basis of." The terms "an embodiment" and "one embodiment" mean "at least one embodiment." The term "another embodiment" means "at least one other embodiment." The terms "first" and "second" can refer to different or identical objects. Other definitions, explicit or implicit, may be included below. Unless otherwise specified in the context, the definition of a term is consistent throughout the description.

The disclosure provides methods of using a production scheduling system document, product design specification documents, and data acquired by a data acquisition automation control system in a factory to automatically label data. According to the methods incorporating teachings of the present disclosure, a data model representing the status features of data is obtained on the basis of data acquired by the data acquisition automation control system, the determined data model is matched against the IoT models generated on the basis of a production scheduling system document and a product design specification document to supplement context information of data, and the status of a production order, for example, the product and the order number the current device processes, is determined according to the matching result. Through such a solution, the cost of marking data is reduced and the production is more efficient. In addition, the solution can help the manager to learn the production status in a factory and schedule the production. The method and apparatus for monitoring the status of a production order according to the embodiments of the disclosure are described in combination with the drawings.

FIG. 1 is an exemplary flowchart of a method 100 for monitoring the status of a production order in a factory incorporating teachings of the present disclosure. First generate at least one production IoT model on the basis of a production scheduling system document in block S102 in FIG. 1. The production IoT model is a model used to represent the production status of a production order. Specifically, generate a production IoT model for each order No. in the production scheduling system document.

Figure 3:
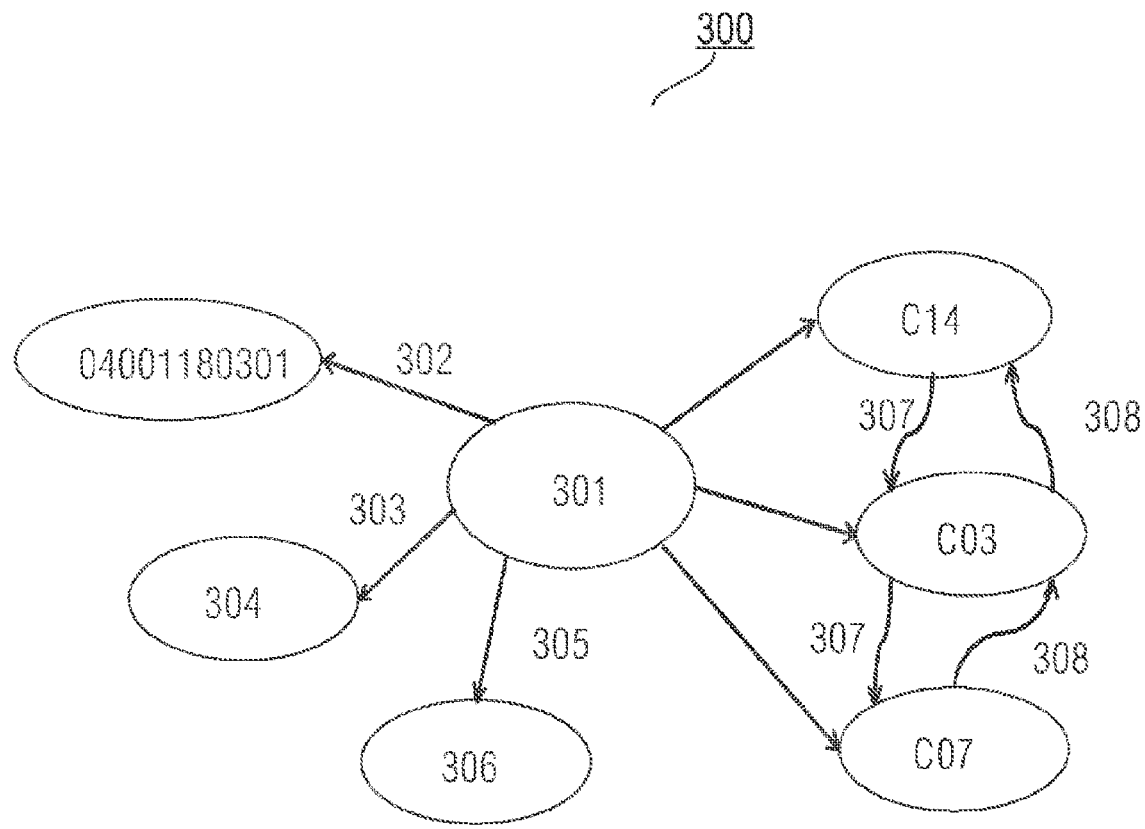
FIG. 3 is a schematic diagram of a production IoT model incorporating teachings of the present disclosure.

FIG. 3 is a schematic diagram of a specific example of a production IoT model 300. The production IoT model 300 shown in FIG. 3 is an IoT model about a production order 301, for example, 04001180301. The IoT model may comprise an order No. 302, for example, 04001180301, a start time 303, for example, April 8 304, and an end time 305, for example April 18 306; the processes comprised in the order include C14, C03 and C07, wherein 307 represents the next process, that is to say, the next process after C14 is C03, the next process after C03 is C07, and 308 represents the previous process.

In some embodiments, a production IoT model may be generated according to a supervisory control and data acquisition (SCADA) system description file. A production IoT model may be set manually by an operator. Different production IoT models comprising different object attributes, relationships between attributes and relationships between objects, for example, may be set for different production lines.

Then, generate a product IoT model on the basis of a product design specification document in block S104. The product IoT model is a model used to represent production process information of a product. The product IoT model can be used to determine important metadata of a production line to obtain feature information of production.

In some embodiments, both the generated production IoT model and the product IoT model comprise process attributes of product processing, and the two IoT models can be associated through the process attributes.

Product metadata may be extracted from a software design tool, for example, product lifecycle management (PLM) or EPLAN, and the product IoT model is generated on the basis of the metadata.

The product design specification document may be a tabular document, XML document or CVS document, for example.

In some embodiments, the product design specification document may be a tabular document. For such a tabular-document, the header in each column in the product design specification document can be used as the attribute of the product IoT model and the value in each column can be used as the value of the attribute of the product IoT model to generate the product IoT model.

Then associate a production IoT model with a product IoT model having the same process attributes in block S106. By associating a production IoT model with a product IoT model, various specific information about a production order, for example, the product and the order No. the current device processes, may be determined according to the attribute values in the two IoT models.

Then, learn data of a production device acquired by a data acquisition automation control system in the factory to obtain a data model representing processing steps of a product in block S108. Wherein, the data acquisition automation control system, for example, may include but is not limited to at least one of the following: vibration sensor, current sensor, temperature sensor and humidity sensor. These sensors are utilized to acquire data of the production device.

A data clustering engine may be used to learn data on the basis of at least one of three dimensions of data: the change time of data, the change period of data and the amplitude of data, for example. The data clustering engine may mark and analyze the events in sensor data to obtain a data model and the data model may represent the processing steps of a product. Those skilled in the art can understand that the data model can also be obtained by using the statistical method or machine learning method to perform a statistical analysis or machine learning for the data obtained from monitoring. In addition, the rules and parameters adopted may be updated according to the feedback from users during the data analysis or machine learning to update the data model.

Finally, match the processing steps against the process attributes of the product IoT model and determine the status of the production order in the factory on the basis of the matching result in block S110.

Specifically, the processing steps may be matched against the process attributes of the product IoT model through the following procedure: First, a search is made in the product IoT model to find whether a variable exists which changes together with the data of processing steps in the data model and has the same period or the same amplitude. If such a variable exists, it is considered that the product IoT model matches the data model, and the product and the order No. the current device processes may be determined according to the attribute values in the production IoT model and the product IoT model.

If no variable directly associated with the data model is found in the product IoT model, the product IoT model may be matched against the data model obtained on the basis of data acquired by another sensor until the product IoT model is matched against all data models obtained on the basis of data acquired by different sensors. If no matched variable is found, feedback may be given that the necessary data does not exist.

The methods for monitoring the status of a production order incorporating teachings of the present disclosure can be used to match raw data in factory production against a production procedure to determine the production status in a factory, for example, the status of an order and the status of a device. Thus, the cost of marking data is reduced and the production is more efficient. In addition, the method can help the manager to learn the production status in the factory and schedule the production.

Figure 2:
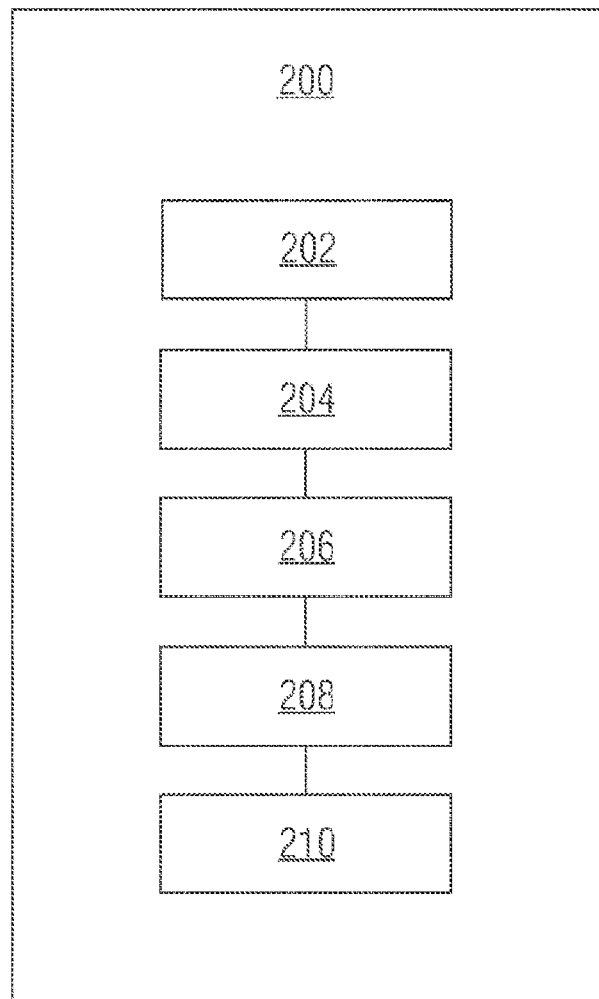
FIG. 2 is a block diagram of an exemplary configuration of an apparatus for monitoring the status of a production order in a factory incorporating teachings of the present disclosure.

FIG. 2 is a block diagram of an exemplary configuration of the apparatus 200 for monitoring the status of a production order in a factory incorporating teachings of the present disclosure. As shown in FIG. 2, the apparatus 200 for monitoring the status of a production order in a factory comprises a production IoT model generation unit 202, a product IoT generation unit 204, an IoT model association unit 206, a data model acquisition unit 208 and an order status determination unit 210.

The production IoT model generation unit 202 is configured to generate at least one production IoT model on the basis of a production scheduling system document and the production IoT model comprises at least process attributes of product processing.

The product IoT model generation unit 204 is configured to generate at least one product IoT model on the basis of a product design specification document and the product IoT model also comprises at least process attributes of product processing.

The IoT model association unit 206 is configured to associate a production IoT model with a product IoT model having the same process attributes.

The data model acquisition unit 208 is configured to learn data of a production device acquired by a data acquisition automation control system in the factory to obtain a data model representing processing steps of a product.

The order status determination unit 210 is configured to match the processing steps against the process attributes of the product IoT model and determine the status of the production order in the factory on the basis of the matching result.

The production IoT model generation unit 204 is further configured to generate a production IoT model for each order No. in the production scheduling system document.

The product IoT model generation unit 206 is further configured to extract product metadata from a software design tool to generate the product IoT model.

The order status determination unit 210 is further configured to determine the product and the order number the current device processes according to the production IoT model and the product IoT model if a data change of the processing steps in the data model matches the process attributes of the product IoT model.

The data acquisition automation control system comprises at least one of a vibration sensor, a current sensor, a temperature sensor and a humidity sensor. The data model acquisition unit 208 is further configured to use a data clustering engine to learn the data to obtain a data model representing processing steps of a product on the basis of at least one of the change time of data, the change period of data and the amplitude of data. Details about the operations and functions of the parts of the apparatus 200 for monitoring the status of a production order in a factory may be, for example, the same as or similar to the related parts of the embodiment of the method 100 for monitoring the status of a production order in a factory, described in combination with FIG. 1, and will not be described here again.

It should be noted that the structure of the apparatus 200 for monitoring the status of a production order in a factory and the constitutional units in FIG. 2 is only exemplary and those skilled in the art may modify the block diagram of the structure shown in FIG. 2 as required.

The application of the method according to the disclosure is described below in combination with a specific example of tracking the status of an order in a small/medium enterprise (SME). A traditional machine tool has no data interface for remote control and status check. Therefore, it is impossible to directly track the status of an order on such a machine tool. However, the working status of the machine tool may be apparent after sensors, for example, a current sensor, a vibration sensor, a temperature sensor and a humidity sensor, are installed.

Table 1 is a production scheduling system document obtained from an order management system.

TABLE 1

| ICA | | Customer ProNo. | | | Program Packing | Insulation preparation | Insulation processing | C01 Cutting/ | 2 C00 | | | 3 | | |
|---|---|---|---|---|---|---|---|---|---|---|---|---|---|---|
| Order No. | | Customer ProNo. | | Code | P-packaging | C01-C03 | C03-C10 | Undercutting | CNC | | | C14 Push | C02 Process | |
| | | | | Code | | | | | | Name: Jin LI | | Table Saw | Board | Name: Jing WANG |
| | | | | | | | | | | Plan | Status | | Plan | Status |
| 2.25 | 08001180134 | C812092 Press Board | | B | 4.8 | 3.24 | 4.8 | 3.24 | 3.29 | | | | | |
| 3.1 | 04001180252 | V101237 Uniform pressure ball with insulation 2-26 | | A | 4.9 | 3.25 | 4.9 | 3.25 | | | | | | |
| 3.1 | 04001180283 | V101238 Uniform pressure ball with insulation 2-26 | | A | 4.9 | 3.25 | 4.9 | 3.25 | | | | | | |
| 3.1 | 04001180301 | V100971 Sef B1 (66 kv) | | B | 4.9 | 3.25 | 4.9 | 3.25 | 3.30 | | | 4.4 | | |
| 3.1 | 04001188302 | V100971 Iron Core C1 (66 kv) | | C | 4.10 | 3.26 | 4.10 | 3.26 | 3.31 | | | | | |
| 3.1 | 04001180307 | V100972 Iron Core C1 (66 kv) | | C | 4.10 | 3.26 | 4.10 | 3.26 | 3.31 | | | | | |
| 3.1 | 04001180318 | V101274 Coil W1 (220 kv) | | W | 4.11 | 3.27 | 4.11 | 3.27 | | | | 4.6 | 4.6 | |
| 3.1 | 04001180306 | V100972 Sat B1 (66 kv) | | B | 4.11 | 3.27 | 4.11 | 3.27 | 4.1 | | | 4.6 | | |
| 3.1 | 04001180312 | V100973 Iron Core C1 (66 kv) | | C | 4.13 | 3.20 | 4.13 | 3.29 | 4.3 | | | | | |
| 2.25 | 04001188311 | V100973 Set B1 (66 kv) | | B | 4.13 | 3.29 | 4.13 | 3.29 | 4.3 | | | 4.8 | | |

| | ICA | C12 Oil passage spacer | | C03 | | | 5 C017 | |
|---|---|---|---|---|---|---|---|---|
| | Order No. | machine | Name: Yan XIA | Bracing Strip | Name: Hao WANG | | Paper Tube | Name: Weican TONG |
| | | | Plan Status | | Plan Status | | | Plan Status |
| 2.25 | 08001180134 | | | | | | | |
| 3.1 | 04001180252 | | | | | | | |
| 3.1 | 04001180283 | | | | | | | |
| 3.1 | 04001180301 | | | 4.9 | | | 4.9 | |
| 3.1 | 04001188302 | | | | | | | |
| 3.1 | 04001180307 | | | | | | | |
| 3.1 | 04001180318 | 4.10 | | 4.11 | | | 4.11 | |
| 3.1 | 04001180306 | | | | | | | |
| 3.1 | 04001180312 | | | | | | | |
| 2.25 | 08001180134 | | | | | | | |

Table 1, it can be seen that order No. 04001180301 involves three processes C14, C03 and C07. Information such as the workstation at which the machine tool works at a point in time can be learned from the production schedule.

On the basis of Table 1, the production IoT model 300 shown in FIG. 3 can be obtained for order No. 04001180301. The IoT model 300 shown in FIG. 3 comprises an order No., start time, end time, process Nos. and relationships thereof.

Table 2 is an example of a product design specification form.

In some embodiments, the parameters of the product IoT model can also be obtained from the data acquisition automation control system in a factory. In addition, recommended values of the parameters can also be obtained from product specifications.

On the basis of the IoT model obtained above, the production procedure of the machine tool X6140 for the unit V101971 in order No. 04001180301 may be determined to be as follows:

TABLE 2

| | | | | | | | | Machining process card | | | | | |
| --- | --- | --- | --- | --- | --- | --- | --- | --- | --- | --- | --- | --- | --- |
| | | | | | | | | | Product type | | | | |
| | | | | | | | | Part drawing No. | XT03-A | | | | |
| | | | | | | | | | | Product name | | | |
| | | | | | | | | Part name Pieces | Square tool | Pieces per | 2 pages in | Page 1 Remarks | |
| | | | Type of blank | Blank dimensions | | | | per blank | 1 | work-station | total 1 | Working hours Preparation to completion | Per piece |
| Material No. | No. 45 steel | | Die forgings | | Workshop | Workshop section | Device | | | | | | |
| Process No. | Process name | | Process content | | | | | | | Process assembly | | | |
| C02 | Forging | | Die forging | | | | | | | | | | |
| C03 | Milling | | Rough milling of exterior surfaces (upper plane, lower plane, left plane and right plane) | | | | X6140 | Special fixture, special measuring tool, disc milling tool | | | | | |
| C12 | Drilling | | Drill bit φ 25, hole φ 23 | | | | Drilling machine | Special fixture, special measuring tool, twist drill, cornish bit | | | | | |
| C14 | Boring | | Counterbore φ36 | | | | Boring machine | Special fixture, special measuring tool, inner hole milling tool | | | | | |
| C07 | Milling | | Semi-immersion milling of upper plane | | | | X6140 | Special fixture, special measuring tool, disc milling tool | | | | | |
| C08 | Milling | | Semi-immersion milling of lower plane | | | | X6140 | Special fixture, special measuring tool, disc milling tool | | | | | |
| | | | | | Designed on | Proofread on | | Reviewed on | | Standardized on | | Counter-signed on | |
| Marks | Number of marks | Changed document No. | Signature | Date | | | | | | | | | |

Figure 4:
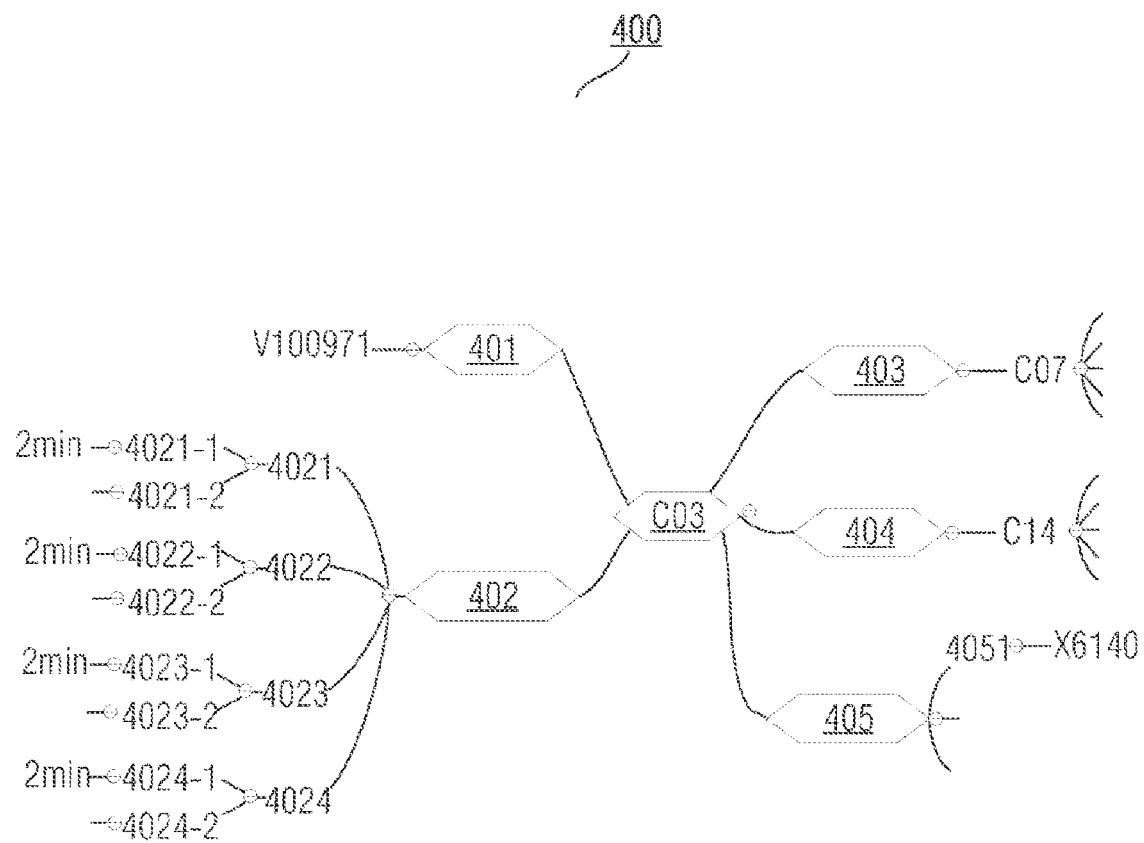
FIG. 4 is a schematic diagram of a product IoT model incorporating teachings of the present disclosure.

On the basis of the design specification form, the parameters of the product IoT model 400 shown in FIG. 4 can be obtained. The IoT model in FIG. 4 can be associated with the IoT model in FIG. 3 through the process attribute C03.

The object 401 indicates that the unit No. is V100971. The process parameter 402 comprises four processing steps: 4021, 4022, 4023 and 4024. The four process steps comprise processing time 4021-1, 4022-1, 4023-1 and 4024-1 and rotational speeds 4021-2, 4022-2, 4023-2 and 4024-2, respectively, wherein the processing time is 2 minutes. The IoT model in FIG. 4 also shows that the next process 403 after the process attribute C03 is C07 and the previous process 404 is C14. Some attributes which the processes C07 and C14 comprise are omitted in FIG. 4. The IoT model in FIG. 4 further comprises a tool 405. The tool 405 may include a machine tool 4051 and the No. of the machine tool 4051 is X6140.

In the IoT models in FIGS. 3 and 4, some important information which is concerned in the example is mainly shown and other information is omitted. Those skilled in the art can understand that the IoT models shown in FIGS. 3 and 4 are provided only for illustration purposes, but do not constitute any restriction on the scope of protection of the present disclosure.

1. The machine tool performs four processing steps in the process C03.

2. Each status lasts 2 minutes respectively.

If the same process exists in the machine tool X6140, the next processes in two orders may be compared until different processes in two orders are found.

Figure 5:
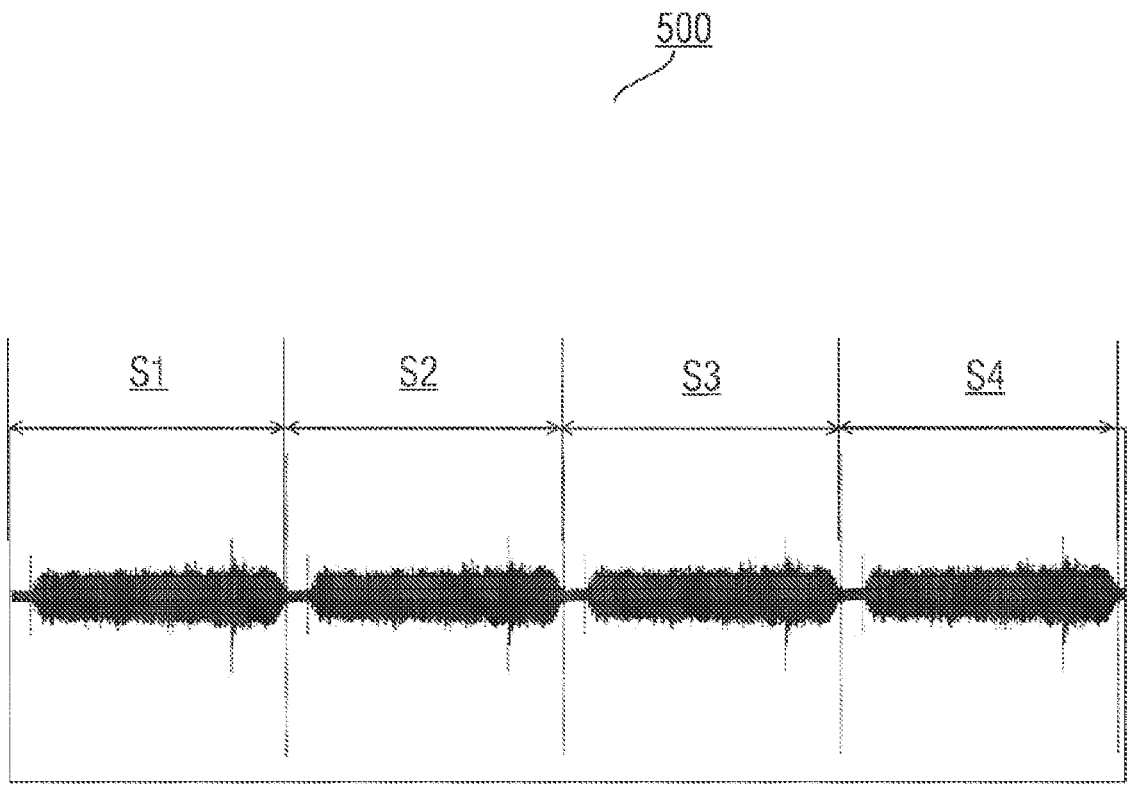
FIG. 5 is a schematic diagram of a vibration data model incorporating teachings of the present disclosure.

In addition, the data model representing processing steps on the basis of vibration data may be determined by learning the data monitored by a vibration sensor disposed on the machine tool. FIG. 5 is a schematic diagram of a vibration data model 500. The following production procedure may be determined from the vibration data model shown in FIG. 5:

1. The machine tool X6140 involves four steps S1, S2, S3 and S4 in the process C03.

2. Each status lasts 2 minutes respectively.

Then, the production status shown in the production IoT model and the production process information of the product shown in the product IoT model may be compared with the data model obtained on the basis of data learning. Specifically, first, a search is made in the product IoT model to find whether a variable exists which changes together with the data of processing steps in the vibration-data-based data model and has the same period or the same amplitude. If such a variable exists, the product and the order No. the current device processes may be determined according to the product IoT model.

If no variable directly associated with the data model is found in the product IoT model of order No. 04001180301, the product IoT model may be matched against the data model obtained on the basis of data acquired by another sensor until the product IoT model is matched against all data models obtained on the basis of data acquired by different sensors, for example, current data acquired by a current sensor or temperature data acquired by a temperature sensor. If no matched variable is found, feedback may be given that the necessary data does not exist.

Figure 6:
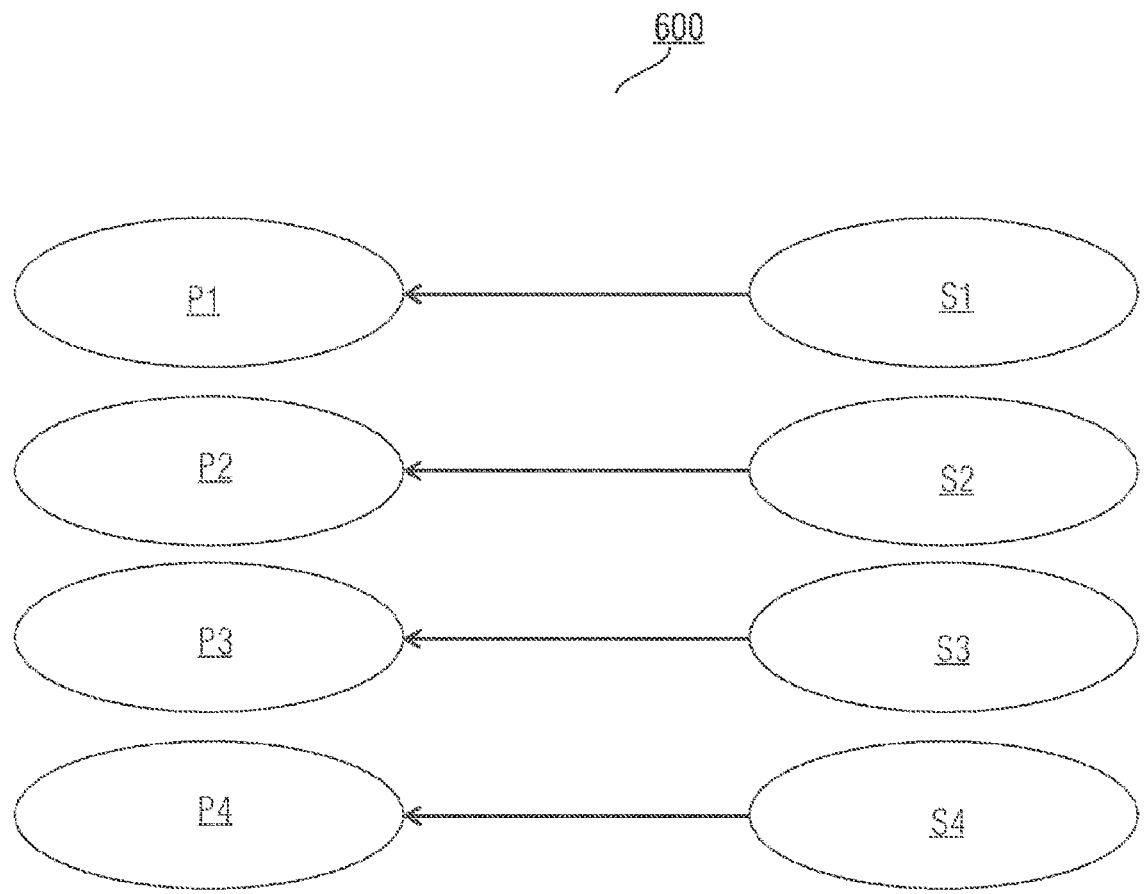
FIG. 6 is a schematic diagram of the match between a product IoT model and a data model incorporating teachings of the present disclosure.

FIG. 6 is a schematic diagram of the result 600 of matching between the process procedures of a product IoT model and the processing steps of a data model. By matching the product IoT model against the data model, it can be determined that the four process procedures P1, P2, P3 and P4 of the process C03 of unit No. V101971 match the four processing steps S1, S2, S3 and S4 of the data model, and thus according to the product IoT model, it can be determined that the order No. which the machine tool currently processes in the process C03 is 0400110301.

Figure 7:
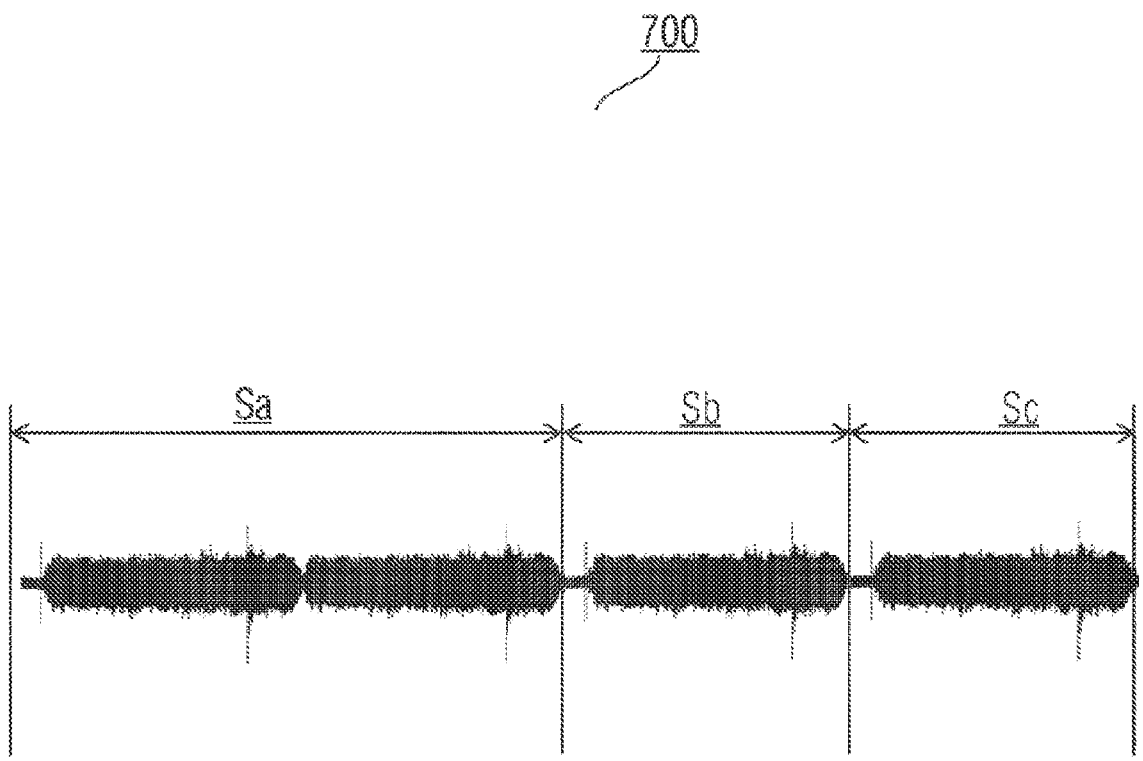
FIG. 7 is a schematic diagram of an incorrect vibration data model incorporating teachings of the present disclosure.

In some cases, an incorrect data model 700 shown in FIG. 7 is obtained after an analysis of vibration data because each procedure may have a different time interval. It can be seen that the vibration data model in FIG. 7 comprises three steps Sa, Sb and Sc.

In this case, the results can be manually changed to four steps, and the change is fed back to the data analysis engine to optimize the rules and the parameters adopted during learning. For example, the time interval can be reduced from the order of seconds to the order of microseconds.

The data of the vibration sensor of X6140 matches the process C03 of V101971 in order No. 0400110301. When the data of the vibration sensor matches the production process, it can be determined that the order No. the machine tool is processing in the process C03 is 0400110301.

A method for monitoring the status of a production order according to the disclosure can be used to match raw data in factory production against a production procedure to determine the production status in a factory, for example, the status of an order and the status of a device. Thus, the cost of marking data is reduced and the production is more efficient. In addition, the method can help the manager to learn the production status in the factory and schedule the production.

The apparatus and method for monitoring the status of a production order according to the embodiments of the disclosure are described by reference to FIGS. 1 to 7. The apparatus for monitoring the status of a production order can be realized by hardware, software or a combination of hardware and software.

Figure 8:
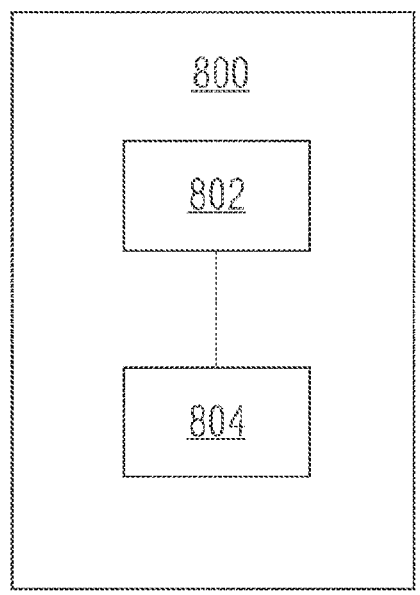
FIG. 8 is a block diagram of the electronic device for monitoring the status of a production order incorporating teachings of the present disclosure.

FIG. 8 is a block diagram of the electronic device 800 for monitoring the status of a production order according to one embodiment of the disclosure. In some embodiments, the electronic device 800 may comprise at least one processor 802 and the processor 802 executes at least one computer-readable instruction (namely, the above-mentioned elements realized in the form of software) stored or coded in a computer-readable storage medium (namely, memory 1004).

In some embodiments, computer-executable instructions are stored in the memory 804, and when the computer-executable instructions are executed, at least one processor 802 completes the following actions: generating at least one production IoT model on the basis of a production scheduling system document, the . . . production IoT model comprising at least process attributes of product processing; generating at least one product IoT model on the basis of a product design specification document, the product IoT model also comprising at least process attributes of product processing; associating a production IoT model with a product IoT model having the same process attributes; learning data of a production device acquired by a data acquisition automation control system in a factory to obtain a data model representing processing steps of a product; and matching the processing steps against the process attributes of the product IoT model and determining the status of the production order in the factory on the basis of the matching result.

When the computer executable instructions stored in the memory 804 are executed, at least one processor 802 will execute various operations and functions described in the embodiments of the disclosure in combination with FIGS. 1 to 7.

In some embodiments, a non-transitory machine-readable medium can have machine-executable instructions (namely, the above-mentioned elements realized in the form of software). When the instructions are executed by a machine, the machine executes various operations and functions described in the embodiments of the disclosure in combination with FIGS. 1 to 7.

In some embodiments, a computer program comprises computer executable instructions, and when the computer executable instructions are executed, at least one processor executes the operations and functions described in the embodiments of the disclosure in combination with FIGS. 1 to 7.

In some embodiments, a computer program product comprises computer executable instructions, and when the computer executable instructions are executed, at least one processor executes the operations and functions described in the embodiments of the disclosure in combination with FIGS. 1 to 7.

The embodiments described above in combination with the drawings are only exemplary embodiments, but do not represent all embodiments that can be realized or fall within the scope of protection of the claims. The term "exemplary" used throughout the description means "used as an example, instance or illustration", but does not mean "preferable" to or "advantageous" over other embodiments. For the purpose of providing an understanding of the described techniques, the embodiments cover specific details. However, these techniques may be implemented without these specific details. In some embodiments, well-known structures and devices are shown in the form of a block diagram to avoid the difficulty in understanding the concepts in the described embodiments.

The above-mentioned description of the disclosure is provided so that those skilled in the art can realize or use the teachings herein. Various modifications to the disclosure are apparent to those skilled in the art, and in addition, the general principle defined in this document may be applied to other variants, without departing from the scope of protection of the disclosure. Therefore, the disclosure is not limited to the examples and designs in this document, but is consistent with the widest scope corresponding to the principles and novel features disclosed in this document.

| Description of reference numerals in the drawings | |
|---|---|
| 100: | Method for monitoring the status of a production order in a factory |
| S102, S104, S106, S108, S110: | Steps |
| 200: | Apparatus for monitoring the status of a production order in a factory |
| 202: | Production IoT model generation unit |
| 204: | Product IoT model generation unit |
| 206: | IoT model association unit |
| 208: | Data model acquisition unit |
| 210: | Order status determination unit |
| 300: | Production IoT model |
| 400: | Product IoT model |
| 301: | Production order No. |
| 302: | Order No. |
| 303: | Start time |
| 304: | Date |
| 305: | End time |
| 306: | Date |
| C14, C03, C07: | Process Nos. |
| 307: | Next process |
| 308: | Previous process |
| 401: | Object |
| 402: | Process parameter |
| 4021, 4022, 4023, 4024: | Processing steps |
| 4021-1, 4022-1, 4023-1, 4024-1: | Processing time |
| 4021-2, 4022-2, 4023-2, 4024-2: | Rotation speeds |
| 403: | Next process |
| 404: | Previous process |
| 405: | Tool |
| 4051: | Machine tool |
| 500: | Vibration data model |
| S1, S2, S3, S4: | Four processing steps in data model |
| 600: | Matching result |
| Pl, P2, P3, P4: | Four process procedures |
| 700: | Incorrect data model |
| Sa, Sb, Sc: | Three processing steps in incorrect data model |
| 800: | Electronic device |
| 802: | Processor |
| 804: | Memory |

What is claimed is:

1. A method for monitoring the status of a production order in a factory, the method comprising:
generating a production IoT model based on a production scheduling system document, the production IoT model comprising a first set of process attributes of product processing;
generating a product IoT model based on a product design specification document, the product IoT model comprising the first set of process attributes of product processing;
associating the production IoT model with the product IoT model;
learning data of a production device acquired by a data acquisition automation control system in the factory to obtain a data model representing processing steps of a product; and
matching the processing steps against the process attributes of the product IoT model and determining the status of the production order in the factory based on the matching result.

2. The method as claimed in claim 1, wherein generating the production IoT model on the basis of the production scheduling system document comprises generating a production IoT model for each order number in the production scheduling system document.

3. The method as claimed in claim 1, wherein generating the product IoT model on the basis of a product design specification document comprises extracting product metadata from a software design tool to generate the product IoT model.

4. The method as claimed in claim 1, wherein matching the processing steps against the process attributes of the product IoT model and determining the status of the production order in the factory on the basis of the matching result comprises determining the product and an order number the current device processes according to the production IoT model and the product IoT model if a data change of the processing steps in the data model matches the process attributes of the product IoT model.

5. The method as claimed in claim 1, wherein the data acquisition automation control system comprises at least one of a vibration sensor, a current sensor, a temperature sensor and a humidity sensor.

6. The method as claimed in claim 1, wherein learning data of a production device acquired by a data acquisition automation control system in the factory to obtain a data model representing processing steps of a product comprises using a data clustering engine to learn the data to obtain a data model representing processing steps of a product on the basis of at least one of the change time of data, the change period of data and the amplitude of data.

7. An electronic device comprising:
a processor; and
a memory coupled with the processor, the memory configured to store instructions, wherein when the instructions are executed by the processor, cause the processor to:
generate a production IoT model based on a production scheduling system document, the production IoT model comprising a first set of process attributes of product processing;
generate a product IoT model based on a product design specification document, the product IoT model comprising the first set of process attributes of product processing;
associate the production IoT model with the product IoT model;
learn data of a production device acquired by a data acquisition automation control system in the factory to obtain a data model representing processing steps of a product; and
match the processing steps against the process attributes of the product IoT model and determining the status of the production order in the factory based on the matching result.

8. The electronic device as claimed in claim 7, wherein the instructions further cause the processor to generate a production IoT model for each order number in the production scheduling system document.

9. The electronic device as claimed in claim 7, wherein the instructions further cause the processor to extract product metadata from a software design tool to generate the product IoT model.

10. The electronic device as claimed in claim 7, wherein the instructions further cause the processor to determine the product and the order number the current device processes according to the production IoT model and the product IoT model if a data change of the processing steps in the data model matches the process attributes of the product IoT model.

11. The electronic device as claimed in claim 7, wherein the data acquisition automation control system comprises at least one of a vibration sensor, a current sensor, a temperature sensor and a humidity sensor.

12. The electronic device as claimed in claim 7, wherein the instructions further cause the processor to use a data clustering engine to learn the data to obtain a data model representing processing steps of a product on the basis of at least one of the change time of data, the change period of data, and the amplitude of data.

\* \* \* \* \*